UNITED STATES PATENT OFFICE.

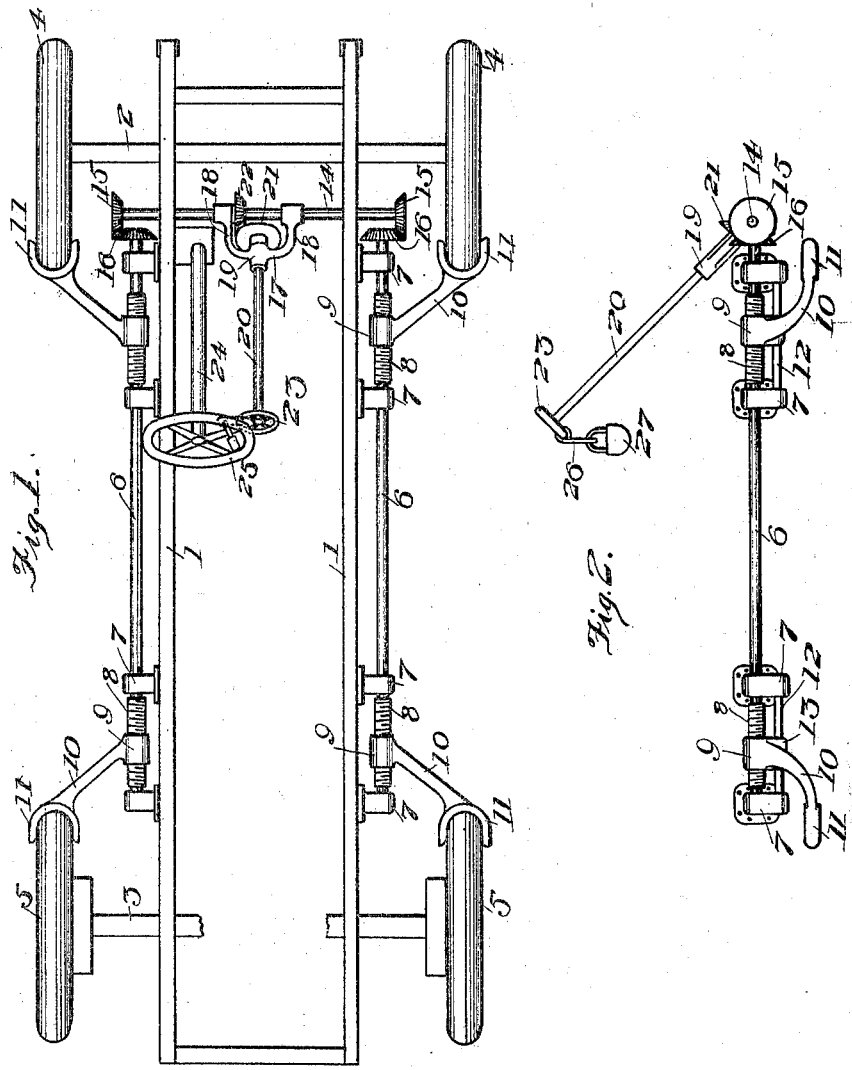

WILLIAM HENRY AUSTIN, OF GREENVILLE, SOUTH CAROLINA.

AUTOMOBILE-LOCK.

1,315,003.      Specification of Letters Patent.      Patented Sept. 2, 1919.

Application filed April 15, 1919. Serial No. 290,263.

*To all whom it may concern:*

Be it known that I, WILLIAM HENRY AUSTIN, a citizen of the United States, and a resident of Greenville, in the county of Greenville and State of South Carolina, have invented certain new and useful Improvements in Automobile-Locks, of which the following is a specification.

My invention is an improvement in automobile locks, and has for its object to provide a lock of the character specified adapted to be mounted upon the frame of an automobile, and having means for simultaneously engaging the four wheels to lock the same from rotation, to prevent tampering with the car by unauthorized parties.

In the drawings:

Figure 1 is a top plan view of the frame of the car provided with the improved lock;

Fig. 2 is a side view of the lock detached.

The present embodiment of the invention is shown in connection with the running gear of a motor vehicle, the said vehicle having the usual frame 1 supported by the axles 2 carrying the front and rear wheels 4 and 5.

The lock comprises a pair of shafts 6 which are journaled in bearings 7 secured to the outer faces of the side members of the frame, and each shaft is journaled in four bearings, the bearings being arranged in pairs, a pair at each end of the shaft, and with the members of the pairs in spaced relation.

Each shaft has secured thereto a worm or screw 8 between each pair of bearings, and upon each of these screws there is threaded a sleeve or collar 9 having an arm 10 extending outwardly therefrom, and provided at its free end with a shoe 11 for engaging the tire of the adjacent wheel.

The arms of each shaft, as shown, extend away from each other, and the screws of each shaft are oppositely arranged so that when either shaft is rotated the arms will be moved toward or from each other, the direction of movement depending upon the direction of rotation of the shaft.

The bearings of each pair are connected below the screw by a bar 12 extending longitudinally of the shaft, and each bar is engaged by a depending portion 13 on the adjacent sleeve 9 for limiting the downward movement of the arm to the position shown in Figs. 1 and 2. The engagement between the portions 13 of each collar and the bar 12 is a sliding engagement, and the bearings are secured to the frame of the car in any suitable or desired manner, as, for instance, by bolting or riveting.

A shaft 14 is journaled transversely of the frame just in rear of the front axle, and this shaft has bevel gears 15 at its ends. Each bevel gear engages with a gear 16 on the adjacent end of the adjacent shaft 6, and it will be obvious that when the shaft 14 is rotated the shafts 6 will be simultaneously rotated thereby.

A yoke comprising a body 17 and arms 18 is supported by the shaft 14, the arms being journaled upon the shaft, and the body 17 has a bearing 19 in which is journaled a shaft 20 at right angles to the shaft 14. This shaft 20 has a bevel gear 21 between the arms of the yoke and the bevel gear meshes with the bevel gear 22 on the shaft 14.

The shaft 20 has a wheel 23 at its upper end by means of which the shaft may be turned in any direction desired, and means is provided for locking this wheel to prevent rotation of the shaft 20 and consequent rotation of the shafts 6.

As shown in Fig. 1, the shaft 20 is arranged at the right of the steering column 24 of the vehicle, in vehicles provided with left hand drives, and the wheel 20 extends to near the steering wheel 25 of the vehicle. A leaf 26 is hinged to the wheel 23 and this leaf is adapted to be locked to the steering wheel by means of a padlock 27 or the like.

In operation, when it is desired to lock the car, the shaft 20 is rotated by means of the wheel 23 in a direction to move the arms 10 of each shaft away from each other, and to move the shoes 11 into close contact with the tires of the wheels. After this has been done the wheel 23 is locked to the steering wheel 25, and it will be obvious that the car will be braked against movement in either direction. To release the car, it is only necessary to release the lock 27 and to turn the wheel 23 in a direction to release the brake shoes. In cars having right hand drive, the position of the wheel 23 and the shaft 20 will be reversed, that is, the shaft and the wheel will be at the left of the steering wheel.

I claim:

1. In a car, the combination with the frame and the supporting wheels, of a shaft journaled on the frame at each side thereof, each shaft having at each end a threaded portion, an arm at each end of each shaft, each arm having a nut engaging the threaded portion, and a brake shoe for engaging the adjacent wheel, means for simultaneously turning the shafts to cause the shoes to simultaneously engage or release the wheels, said means comprising a shaft journaled transversely of the frame and geared to the first named shafts, a driving shaft having a driving connection with the transverse shaft and provided with a wheel arranged adjacent to the steering wheel and having means for locking said wheels together.

2. In a car, the combination with the frame and the supporting wheels, of a shaft journaled on the frame at each side thereof, each shaft having at each end a threaded portion, an arm at each end of each shaft, each arm having a nut engaging the threaded portion, a brake shoe for engaging the adjacent wheel, and means for simultaneously turning the shafts to cause the shoes to simultaneously engage or release the wheels.

3. In a car, the combination with the frame and the supporting wheels, of a brake shoe adjacent to each wheel and mounted to move longitudinally of the frame toward and from the wheel, means for simultaneously moving the shoes toward and from the wheels, said means comprising a shaft journaled adjacent to the steering column and provided with a wheel, said shaft being connected with the shoes to control the same, said shaft having a wheel adjacent to the steering wheel, and means for locking the wheel to the steering wheel.

4. In a car, the combination with the frame, the supporting wheels and the tires on the wheels, of a brake shoe adjacent to each wheel and mounted to move longitudinally of the frame toward and from the wheel for engaging the tire, and means for simultaneously moving the shoes toward and from the wheels.

WILLIAM HENRY AUSTIN.

Witnesses:
JOHN S. TAYLOR,
CHAS. LEAGUE.